(12) United States Patent
Faye et al.

(10) Patent No.: US 6,962,396 B2
(45) Date of Patent: Nov. 8, 2005

(54) METHOD AND DEVICE FOR CONTROLLING A BRAKE SYSTEM FOR A VEHICLE

(75) Inventors: Ian Faye, Stuttgart (DE); Helmut Wiss, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/842,912

(22) Filed: May 10, 2004

(65) Prior Publication Data

US 2004/0207257 A1    Oct. 21, 2004

Related U.S. Application Data

(63) Continuation of application No. 09/146,900, filed on Sep. 3, 1998, now abandoned.

(30) Foreign Application Priority Data

Sep. 4, 1997    (DE) ............................... 197 38 690

(51) Int. Cl.[7] ............................................... B60T 8/32
(52) U.S. Cl. .................... 303/191; 303/125; 303/193
(58) Field of Search ............................ 303/3, 15, 193, 303/20, 125, 191

(56) References Cited

U.S. PATENT DOCUMENTS

| 5,173,859 A | 12/1992 | Deering |
| 5,234,071 A | 8/1993 | Kajiwara |
| 5,752,214 A | 5/1998 | Minowa et al. |
| 5,754,099 A | 5/1998 | Nishimura et al. |
| 6,018,308 A | 1/2000 | Shirai |

FOREIGN PATENT DOCUMENTS

| DE | 196 33 736 | 2/1988 |
| DE | 43 10 354 | 10/1993 |
| DE | 43 39 066 | 5/1995 |
| DE | 195 24 939 | 1/1997 |

OTHER PUBLICATIONS

H. Winner et al., "Adaptive Cruise Control System Aspects and Development Trends", SAE paper No. 961010, Feb. 1996.

*Primary Examiner*—Matthew C. Graham
(74) *Attorney, Agent, or Firm*—Kenyon & Kenyon

(57) ABSTRACT

A method and a device for controlling a brake system of a vehicle, with an automatic braking action being triggered when a threshold value is exceeded. The threshold value is varied as a function of a quantity derived from the distance to an obstacle located in front of the vehicle.

10 Claims, 2 Drawing Sheets

METHOD AND DEVICE FOR CONTROLLING A BRAKE SYSTEM FOR A VEHICLE

CROSS-REFERENCE TO RELATED APPLICATIONS

This application is a continuation of U.S. patent application Ser. No. 09/146,900, filed Sep. 3, 1998 now abandoned, which is expressly incorporated herein by reference in its entirety.

FIELD OF THE INVENTION

The present invention relates to a method and a device for controlling the brake system of a vehicle.

BACKGROUND INFORMATION

A conventional method and device of this type are described in German Patent Application No. 195 24 939, which provides a controller for a brake system in which braking force is exerted upon the wheel brakes beyond the actual driver input in certain operating situations detected on the basis of the driver's braking intention. One of these operating situations is one in which a hazardous situation can be concluded from the driver's response. To detect this situation, the way in which the driver presses the brake operating element is analyzed. If he presses the element very quickly, which is determined for example by a variation in brake system admission pressure, pressure builds up beyond the driver input. If the analyzed quantity exceeds a specific threshold value (trigger threshold), the automatic braking action (i.e., increased buildup of braking force) takes place. The trigger threshold is varied on the basis of specific performance quantities, thereby reducing the trigger threshold, which means that increased braking force buildup triggering becomes more sensitive as the potential danger increases. The performance quantities described above are braking system admission pressure, vehicle velocity, rate of vehicle rotation, transverse vehicle acceleration, longitudinal vehicle acceleration, variation of the steering angle, engine power output, and/or the brake pressure requested by a vehicle dynamics controller. Since too sensitive of a brake assistant, which could trigger an automatic braking action even in non-hazardous situations, is not desired, special attention must be paid to determining the trigger threshold.

One of the objects of the present invention is to provide a means (e.g., an arrangement) for very reliably detecting potential danger and making the brake assistant response more sensitive in the event of a perceived danger.

SAE paper No. 961010, entitled "Adaptive Cruise Control, System Aspects and Development Trends" by Hermann Winner, Stefan Witte, Werner Uhler, and Bernd Lichtenberg describes an adaptive cruise control system that is equipped with sensors for detecting obstacles in front of the vehicle. The adaptive cruise control system detects the distance to the obstacles in front of the vehicle as well as their relative velocity. Based on additional sensor signals, it selects the closest obstacle and, if necessary, reduces the road speed of the vehicle equipped with the adaptive cruise control system.

SUMMARY OF THE INVENTION

According to the device and method of the present invention, by taking into account a signal detected by the automatic cruise control system or a signal derived from the detected signal representing a hazardous situation, a detection of a potential danger is improved so that the trigger threshold of the automatic braking action becomes more sensitive only when a hazardous situation is highly probable.

This avoids, or at least reduces, the danger of triggering the automatic braking action in inappropriate situations due to a sensitive trigger threshold.

Another embodiment of the method and system according to the present invention provides that the distance between the vehicle and an obstacle located in front of the vehicle is analyzed.

Another embodiment of the method and system according to the present invention provides that the relative velocity of an obstacle located in front of the vehicle is analyzed.

Another embodiment of the method and system according to the present invention provides that the trigger threshold is reduced even when the automatic cruise control system is inactive.

Another embodiment of the method and system according to the present invention provides that the trigger threshold is reduced when the adaptive cruise control system is in servo control mode.

Another embodiment of the method and system according to the present invention provides that the trigger threshold reduction is limited so that the driver does not trigger the automatic braking action when lightly pressing the operating element.

It is also advantageous for the automatic braking action to be triggered by the closing of the brake pedal switch when a potential danger is present instead of reducing the trigger threshold.

DETAILED DESCRIPTION

Figure 1:
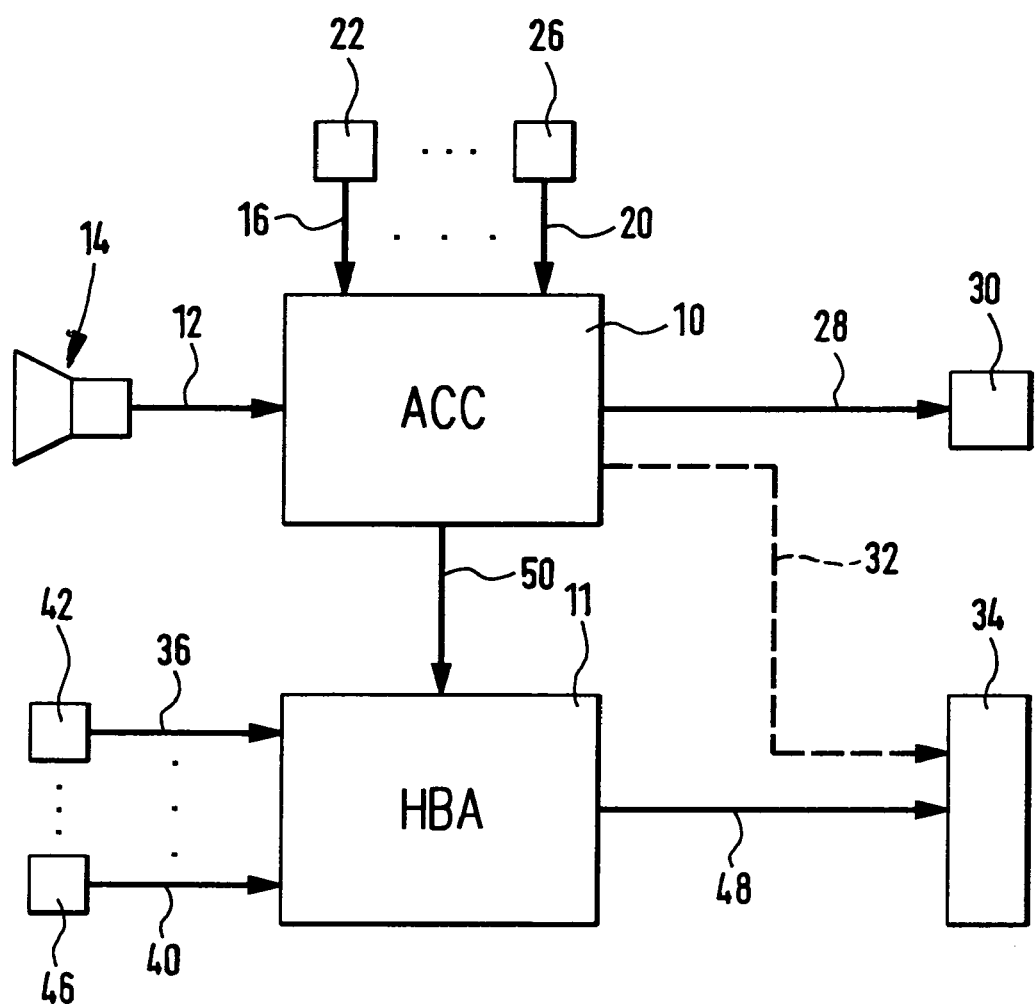
FIG. 1 shows a block diagram of an adaptive cruise control system (ACC) and a hydraulic brake assistant (HBA) comparable with conventional cruise control systems and hydraulic brake assistants.

FIG. 1 shows a block diagram which illustrates control unit 10 for an adaptive cruise control system (ACC) and control unit 11 for a hydraulic brake assistant (HBA). Control unit 10 of the adaptive cruise control system is connected via an input line 12 to a proximity device 14, preferably a multi-beam radar device. Control unit 10 is also connected via input lines 16 through 20 to measuring devices 22 through 26 in order to detect further performance quantities such as steering angle, driver input from control elements, vehicle velocity, etc. Control unit 10 controls the vehicle engine power in cruise control mode and in servo control mode via output line 28, using actuators 30, preferably an electrical butterfly control valve. According to an embodiment of the present invention, control unit 10 also acts upon the vehicle brake system in order to slow down the vehicle and builds up brake pressure at the vehicle wheels independently of the driver's braking intention. In FIG. 1, this is represented by broken output line 32, which leads to a hydraulic brake system 34 with electrically controlled valve and pump arrangements for building up brake pressure independently of the driver. This type of brake system is described in the conventional systems.

Control unit 11 for the hydraulic brake assistant has input lines 36 through 40 which connect it to measuring devices 42 through 46 for detecting performance quantities such as at least one operating signal of the braking element, wheel speed signals, etc. Control unit 11 for the hydraulic brake assistant controls, via output lines 48, a hydraulic brake system 34 similar to that of a conventional system, with an increased braking force in relation to the driver's braking intention building up at the vehicle wheels in predetermined operating situations. A communications line 50 is also provided which interconnects control units 10 and 11, with at least one performance quantity of the ACC representing an existing potential danger being transmitted to control unit 11 from control unit 10.

The operation of the adaptive cruise control system and the hydraulic brake assistant is also provided using the conventional systems.

When a variable trigger threshold is exceeded, the hydraulic brake assistant builds up, by controlling the valve and pump arrangement of hydraulic brake system 34, a brake pressure in addition to the brake pressure input by the driver as he presses the control element (brake pedal). This trigger threshold includes at least one threshold value for varying at least one operating signal of the control element (brake pedal), e.g. the admission pressure in the hydraulic brake system, the pressure in the brake master cylinder of the brake system, the pedal travel, the operating force of the brake pedal, or the torque applied upon operating the pedal. The trigger threshold, i.e. the threshold value, can be varied as a function of at least one performance quantity, e.g. the absolute value of the operating signal. If the quantity exceeds the at least one threshold value, the hydraulic brake assistant activates the pressure supply of the brake system and operates the electrical valve arrangements so that brake pressure in addition to the driver input builds up at least in selected wheel brakes via the pressure supply. As a rule, the brake pressure increases up to full braking, possibly until an anti-lock controller responds. The automatic braking action is interrupted if the operating signal drops below at least one additional threshold value.

The automatic braking sequence should be reliably triggered in hazardous situations, but should not be triggered in non-hazardous situations, especially in consideration of other traffic elements. The selection of the at least one threshold value is therefore a compromise between sensitivity and safety. To resolve this conflict, the adaptive cruise control system provides the brake assistant with at least one signal representing a possible hazardous situation. This signal represents an ACC performance quantity and, in one embodiment, is the distance to an obstacle located in front of the vehicle; in another embodiment, it is the relative velocity of this obstacle, indicating that the ACC has detected a relevant vehicle and is in servo control mode (proximity control mode); or a combination of these signals. The shorter the distance to the obstacle, possibly taking into account the vehicle's own road speed, and/or the greater the relative velocity in relation to the obstacle, the greater the reduction in the trigger threshold and the more sensitive the brake assistant becomes. If the signal indicates a detected obstacle and activation of the servo control mode by the ACC, the threshold is reduced by a specific absolute value. In an embodiment according to the present invention, this is a characteristic curve or map in which a threshold value is read out depending on the ACC performance quantity supplied. This threshold value is limited before reaching low values, thereby avoiding too high a brake assistant sensitivity and thus triggering its function even when the control element is pressed lightly.

Alternatively, the brake assistant function is triggered as a function of closing the brake pedal switch, based on at least one of the above-mentioned signal quantities, if the need for full braking arises from the measured speed and the measured distance or the measured relative velocity. In this case, the increase in braking force is activated as early as the first time the control element is touched.

In another embodiment, the at least one threshold value for triggering an automatic braking action is reduced only when the ACC is inactive, i.e. if the driver has turned it off.

In yet another embodiment, both systems are combined into one control unit. If this is not the case, communication between the two systems is advantageously carried out via a bus connection. Communication does not have to be particularly fast in this embodiment. For example, 20 ms is a suitable interval for transmitting the ACC information to the HBA.

Figure 2:
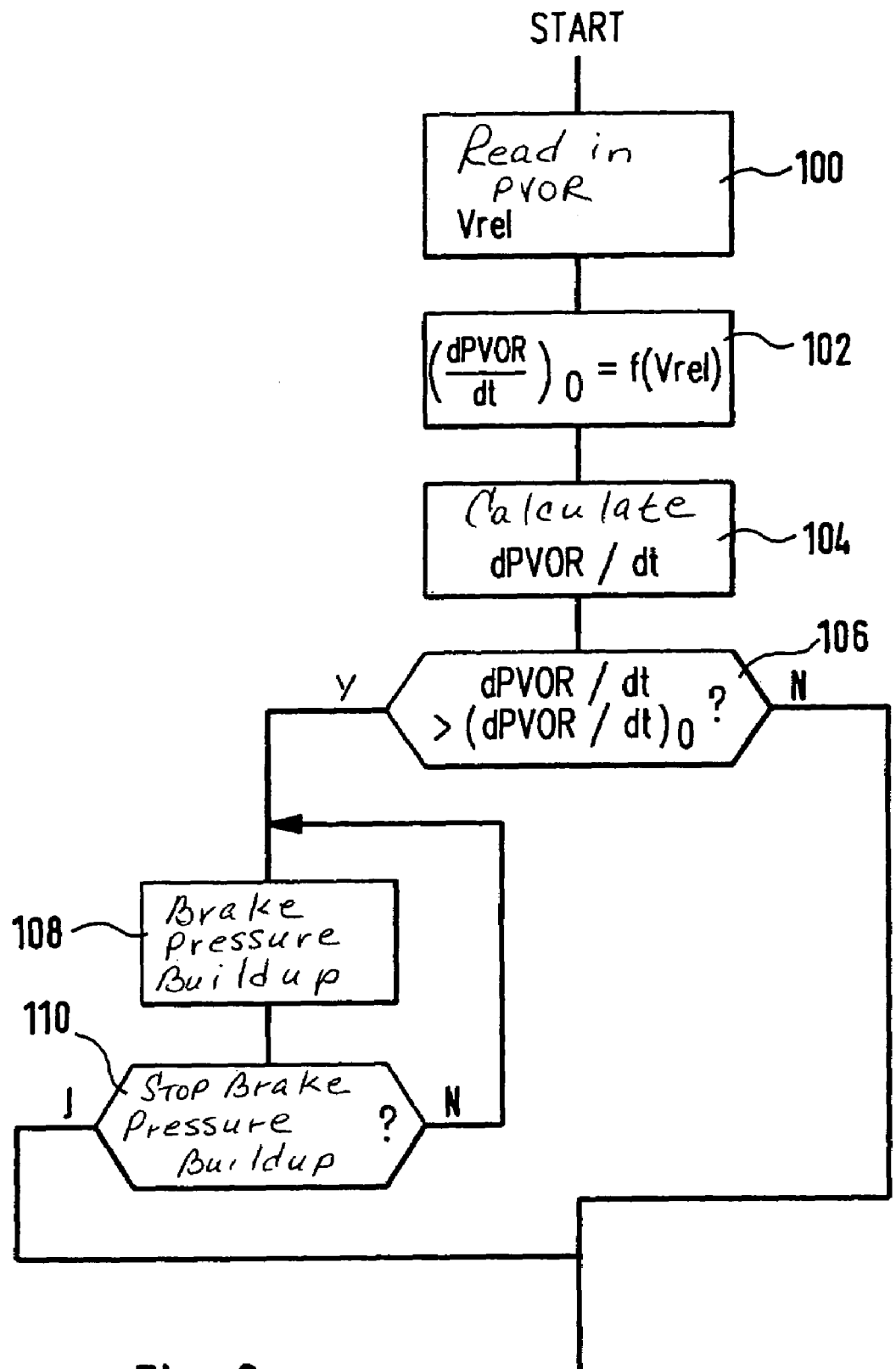
FIG. 2 shows a schematic diagram of a computer program, in the form of a flowchart, which is executed in the hydraulic brake assistant and which illustrates a reduction in the trigger threshold as a function of a performance quantity of the adaptive cruise control system.

FIG. 2 shows, using a flowchart, a further embodiment for reducing the trigger threshold of the brake assistant according to the present invention. In this embodiment, the variation in admission pressure is analyzed in order to trigger the brake assistant function. Likewise, the ACC transmits relative velocity Vrel of an obstacle in front of the vehicle in the example shown in FIG. 2. In other embodiments according to the present invention, the distance to the obstacle, the operating status of the ACC, etc. are transmitted, or the relative velocity is determined in control unit 11 from the variation in distance and the vehicle's own velocity. The program (e.g., the method) shown in FIG. 2 is executed at specific points in time.

In a first step 100, the quantities relevant for carrying out the function (admission pressure PVOR and relative velocity Vrel of an obstacle in front of the vehicle, which is transmitted by the ACC) are read in. In step 102, threshold value dPVOR/dt(0) for the variation in admission pressure based on relative velocity Vrel is subsequently selected, for example, on the basis of a characteristic curve or a table or on the basis of a mathematical function. The absolute value of the threshold decreases as the relative velocity increases. The reason for this is that the probability of a hazardous situation, and therefore the need for full braking, rises as the vehicle approaches an obstacle located in front of it. In subsequent step 104, the variation in admission pressure dPVOR/dt is calculated. In subsequent query step 106, the calculated value of admission pressure change is compared to the threshold value determined in step 102. If the change exceeds the threshold value, i.e. if the driver presses the pedal very rapidly, a brake pressure buildup independent of the driver is initiated by activating the pumps and valves of the hydraulic brake system according to step 108. In subsequent step 110, the system checks whether this pressure buildup should be terminated. This is the case, for example, when a cutoff criterion for the brake assistant function is met (e.g. the absolute value of the admission pressure drops below a predetermined threshold value). If the brake pressure buildup should be terminated, the brake system is operated so as to reduce the additional brake pressure, with the result that the brake force input by the driver is applied to the wheel brakes. The program (e.g., the method according to the present invention) is then terminated. If the additional brake pressure buildup should continue, the program resumes from step 108. If step 106 revealed that the threshold value was not exceeded, the program ends and is repeated at the specified time.

According to yet another embodiment, the threshold value is not only dependent on the relative velocity transmitted by the ACC but also on at least one of the performance quantities described by the related art mentioned in the preamble.

One of the objects according to the present invention is achieved in an advantageous manner also with pneumatic brake systems or brake systems with electromotive brake application.

In another embodiment, the performance quantity (distance or relative velocity) is detected by the HBA.

What is claimed is:

1. A method for controlling a braking system of a vehicle, the method comprising:
   recording a signal representing an operation of a brake operating element;
   recording at least one performance quantity which indicates a hazardous situation;
   forming a threshold value for the operating signal based on the at least one performance quantity; and
   triggering an automatic braking procedure by building up a braking force at at least one wheel brake when the operating signal exceeds the threshold value;
   wherein the at least one performance quantity is a variable corresponding to a distance to an obstacle that is located in front of the vehicle, and the threshold value is a function of the at least one performance quantity such that the triggering of the braking procedure becomes more sensitive as a danger of the hazardous situation increases.

2. The method according to claim 1, wherein the at least one performance quantity is indicative of a relative velocity of the vehicle with respect to the obstacle.

3. The method according to claim 2, wherein the relative velocity of the vehicle is determined as a function of a change in the distance from the vehicle to the obstacle and as a function of a road speed of the vehicle.

4. The method according to claim 1, wherein the at least one performance quantity is indicative of status information of a cruise control system, the status information indicating whether the cruise control system is operating in a servo control mode.

5. The method according to claim 1,
   wherein the automatic braking is triggered as a function of a closing status of a brake switch of the vehicle in the hazardous situation, and
   wherein the closing status is detected as a function of the at least one performance quantity.

6. The method according to claim 1, further comprising:
   modifying the at least one predetermined threshold value only if a cruise control system of the vehicle is inactive.

7. The method according to claim 1, wherein the braking force is modified by increasing or decreasing the braking force.

8. A device for controlling a braking system of a vehicle, comprising:
   a controlling arrangement which at least one of builds up and reduces a braking force at a wheel brake, in addition to a driver's input, the controlling arrangement including a program for performing the following operations:
      recording a signal representing an operation of a brake operating element and at least one performance quantity which indicates a hazardous situation,
      ascertaining a threshold value for the operating variable based on the at least one performance quantity,
      comparing the operating variable to the threshold value, and
      triggering an automatic buildup of a braking force when the operating variable exceeds the threshold value;
   wherein the at least one performance quantity corresponds to a distance to an obstacle that is located in front of the vehicle, and the program is operable to specify the threshold value to be a function of the at least one performance quantity so that a triggering of the braking procedure becomes more sensitive as the danger of the hazardous situation increases.

9. The device according to claim 8, wherein the control unit modifies a brake force by increasing or decreasing the brake force.

10. The device according to claim 8, further comprising:
    a further control unit controlling an adaptive cruise control system and providing the at least one performance quantity to the control unit.

* * * * *

UNITED STATES PATENT AND TRADEMARK OFFICE
CERTIFICATE OF CORRECTION

| | | |
|---|---|---|
| PATENT NO. | : 6,962,396 B2 | Page 1 of 1 |
| APPLICATION NO. | : 10/842912 | |
| DATED | : November 8, 2005 | |
| INVENTOR(S) | : Ian Faye et al. | |

It is certified that error appears in the above-identified patent and that said Letters Patent is hereby corrected as shown below:

Column 5, line 44, change "wherein the automatic braking is triggered" to --wherein the automatic braking procedure is triggered--

Signed and Sealed this

First Day of August, 2006

JON W. DUDAS
*Director of the United States Patent and Trademark Office*